(12) United States Patent
Yardley

(10) Patent No.: US 11,513,695 B2
(45) Date of Patent: Nov. 29, 2022

(54) VITAL PRODUCT DATA SYNCHRONIZATION

(71) Applicant: International Business Machines Corporation, Armonk, NY (US)

(72) Inventor: Brent William Yardley, Hillsboro, OR (US)

(73) Assignee: International Business Machines Corporation, Armonk, NY (US)

(*) Notice: Subject to any disclaimer, the term of this patent is extended or adjusted under 35 U.S.C. 154(b) by 54 days.

(21) Appl. No.: 17/111,293

(22) Filed: Dec. 3, 2020

(65) Prior Publication Data

US 2022/0179561 A1 Jun. 9, 2022

(51) Int. Cl.
*G06F 3/06* (2006.01)
*G06F 11/30* (2006.01)

(52) U.S. Cl.
CPC ............ *G06F 3/0619* (2013.01); *G06F 3/065* (2013.01); *G06F 3/067* (2013.01); *G06F 3/0647* (2013.01); *G06F 11/3034* (2013.01)

(58) Field of Classification Search
CPC ...... G06F 3/0619; G06F 3/0647; G06F 3/065; G06F 3/067; G06F 11/3034
See application file for complete search history.

(56) References Cited

U.S. PATENT DOCUMENTS

| | | | |
|---|---|---|---|
| 6,081,812 A | 6/2000 | Boggs et al. | |
| 6,708,297 B1 | 3/2004 | Bassel | |
| 7,168,007 B2 | 1/2007 | Gilstrap et al. | |
| 8,724,282 B2 | 5/2014 | Hiremath et al. | |
| 10,671,555 B2 | 6/2020 | Takahashi et al. | |
| 2008/0126522 A1* | 5/2008 | Anna | H04L 67/1095 709/223 |
| 2010/0281246 A1* | 11/2010 | Bristow | G06F 11/1425 713/100 |

(Continued)

FOREIGN PATENT DOCUMENTS

EP 1316017 A2 6/2003

OTHER PUBLICATIONS

Techopedia, "Data Redundancy," techopedia, Aug. 11, 2020, 3 pages, retrieved from https://www.techopedia.com/definition/18707/data-redundancy#:~:text=Data%20redundancy%20is%20a%20condition,multiple%20software%20environments%20or%20platforms.

(Continued)

*Primary Examiner* — Jason W Blust
(74) *Attorney, Agent, or Firm* — Zilka-Kotab, P.C.

(57) ABSTRACT

A method for data synchronization includes identifying a replaced component amongst a plurality of components in a storage system, establishing a quorum amongst the plurality of components in the storage system, and updating vital product data stored on the replaced component based at least in part on the quorum amongst the plurality of components in the storage system. A computer program product for data synchronization includes one or more computer readable storage media and program instructions collectively stored on the one or more computer readable storage media. The program instructions include program instructions to perform the foregoing method. A system includes a processor and logic integrated with the processor, executable by the processor, or integrated with and executable by the processor. The logic is configured to perform the foregoing method.

18 Claims, 9 Drawing Sheets

(56) References Cited

U.S. PATENT DOCUMENTS

2013/0117766 A1* 5/2013 Bax ................ G06F 9/4405
                                                    719/323
2017/0163519 A1   6/2017 Bowers et al.

OTHER PUBLICATIONS

Wikipedia, "Data redundancy," Wikipedia, 2020, 2 pages, retrieved from https://en.wikipedia.org/wiki/Data_redundancy.
Wikipedia, "Data integrity," Wikipedia, 2020, 6 pages, retrieved from https://en.wikipedia.org/wiki/Data_integrity.

* cited by examiner

500

- If the local state fields are set to zero, then the processor will attempt to check the values of the alternate non-authoritative replaceable component configuration.
  ○ If the alternate non-authoritative replaceable component configuration bytes are zero, then the processor will check the authoritative replaceable components configuration bytes.
    • If both authoritative replaceable components state fields are zero, then the system is in the genesis case.
    • If either of the authoritative replaceable components state fields are non-zero, then the local controller will do a sync check between the two authoritative replaceable components persistent data.
      • If they match, then the local non-authoritative replaceable component will copy the authoritative replaceable component persistent data to the local non-authoritative replaceable component's persistent data.
      • If they do not match, then the local non-authoritative replaceable component will stop, this is a failure and report an error to the system, that the authoritative replaceable component VPD are not in sync and the sync process cannot continue as there is only one copy of persistent data in the system.
  ○ If the alternate non-authoritative replaceable components configuration is not zero, then the local non-authoritative replaceable component will wait to be updated by the alternate non-authoritative replaceable component. The alternate non-authoritative replaceable component is responsible for making sure that the correct data is copied to the new non-authoritative replaceable component. If there is a request for enclosure data during this state, then the non-authoritative replaceable component will return to failure that the local data has not yet been updated.

- If the local state fields are not zero, then it will attempt to check the values of the alternate non-authoritative replaceable component configuration.
  ○ If the alternate non-authoritative replaceable component's configuration bytes are zero, then it will check the authoritative replaceable components configuration bytes.
    • If the authoritative replaceable components state fields are zero, then the system is forced to the genesis case; even though the local non-authoritative replaceable component configuration is set. This is a fault condition, but is assume recoverable.
    • If either of the authoritative replaceable components state fields are non-zero, then the local controller will do a sync check between the two authoritative replaceable components persistent data.
      • If they match, then a sync check is made with the local non-authoritative replaceable component's persistent data
        ○ If they match, then the local non-authoritative replaceable component will copy the persistent data from the local non-authoritative replaceable component to the remote non-authoritative replaceable component and update the state field bytes.
        ○ If they do not match, then this is likely a dual non-authoritative replaceable component replacement, the local non-authoritative replaceable component will copy the persistent data from the authoritative replaceable components, and then copy the persistent data from the local non-authoritative replaceable component to the remote non-authoritative replaceable component and update the state field bytes.
      • If they do not match, then the local non-authoritative replaceable component will check its local data against each authoritative replaceable component.
        ○ If there is a match between a non-authoritative replaceable component and an authoritative replaceable component, then the authoritative replaceable component that does not match, will be synced to the matching authoritative replaceable component and non-authoritative replaceable component, and then the remote non-authoritative replaceable component will be updated.
        ○ If there is no match, this is a failure that cannot be resolved, the authoritative replaceable components are not in sync, and the local non-authoritative replaceable component does not match either authoritative replaceable components.

FIG. 5 (continued)

○ If the alternate non-authoritative replaceable components configuration bytes are non-zero, then a sync check is made between the two non-authoritative replaceable components
  • If non-authoritative replaceable component's persistent data is the same, then the local non-authoritative replaceable component, in slot 0, will check the authoritative replaceable components configuration bytes
    • If the authoritative replaceable components configuration bits are set, then a persistent data check is made between the non-authoritative replaceable components and the authoritative replaceable components
      ○ If both authoritative replaceable components persistent data matches the non-authoritative replaceable components persistent data, then the sync is complete
      ○ If one of the authoritative replaceable components persistent data does not match, then this is likely a authoritative replaceable component replacement, the persistent data from the alternate authoritative replaceable component is copied to the non-matching authoritative replaceable component which completes the sync
      ○ If both authoritative replaceable components do not match the non-authoritative replaceable components, then the non-authoritative replaceable component checks if the authoritative replaceable components match each other.
        • If the authoritative replaceable components match each other, but do not match the non-authoritative replaceable components, then this likely a dual non-authoritative replaceable component replacement. The local non-authoritative replaceable component will copy the authoritative replaceable component persistent data to the local non-authoritative replaceable component, and then copy the local non-authoritative replaceable component persistent data to the remote non-authoritative replaceable component.
  • If the authoritative replaceable components do not match, then this is a failure, it is likely a dual non-authoritative replaceable component replacement, with an authoritative replaceable component replacement, which is a failure condition.

FIG. 5 (continued)

- If one of authoritative replaceable components configuration bits are not set, then check that the authoritative replaceable components with the configuration bytes are set matches the non-authoritative replaceable component persistent data
  - If the authoritative replaceable component persistent data matches the non-authoritative replaceable component persistent data, then this is an authoritative replaceable component replacement, copy the matching persistent data to the replacement authoritative replaceable component, and set the state field bytes on the authoritative replaceable component.
  - If the authoritative replaceable component persistent data does not match the non-authoritative replaceable component persistent data, then this is a fault condition, even though the non-authoritative replaceable components match, there is no matching authoritative replaceable component.
- If the non-authoritative replaceable component persistent data is not the same, then the non-authoritative replaceable component in slot 0, will check the authoritative replaceable components configuration bytes as the local non-authoritative replaceable component.
  - If the authoritative replaceable components state fields are zero, then the system is forced to the genesis case; even though the local and remote non-authoritative replaceable component configuration is set. This is a fault condition, but is assume recoverable.
  - If either of the authoritative replaceable components state fields are non-zero, then the local controller will do a sync check between the two authoritative replaceable components persistent data
    ○ If they match, then a sync check is made with the local non-authoritative replaceable component's persistent data
      • If they match, then the local non-authoritative replaceable component will copy the persistent data from the local non-authoritative replaceable component to the remote non-authoritative replaceable component
      • If they do not match, then a sync check is made between the remote non-authoritative replaceable component and the authoritative replaceable component data

- If they match, then the local non-authoritative replaceable component will overwrite its persistent data with the match data from the authoritative replaceable components and remote non-authoritative replaceable component
- If they do not match, then neither non-authoritative replaceable component matches the authoritative replaceable components. The local non-authoritative replaceable component will copy the authoritative replaceable component data to the local non-authoritative replaceable component, and then copy the local data to the remote non-authoritative replaceable component, completing the sync ○ If the authoritative replaceable component data does not match, then the local non-authoritative replaceable component will check its local data against each authoritative replaceable component.
  - If there is a match between the local non-authoritative replaceable component and an authoritative replaceable component, then the authoritative replaceable component that does not match, will be synced to the matching authoritative replaceable component and non-authoritative replaceable component, and then the remote non-authoritative replaceable component will be updated, completing the sync
  - If there is no match, then the remote non-authoritative replaceable component will be checked against each authoritative replaceable component
    - If there is a match between the remote non-authoritative replaceable component and an authoritative replaceable component, then the authoritative replaceable component that does not match, will be synced to the matching authoritative replaceable component and non-authoritative replaceable component, and then the local non-authoritative replaceable component will be updated, completing the sync
    - If there is no match, this is a failure that cannot be resolved, each authoritative replaceable component and each non-authoritative replaceable component has different data, and they all say they have valid configurations. The processors for both non-authoritative replaceable components must report a sync failure.

FIG. 5 (continued)

VITAL PRODUCT DATA SYNCHRONIZATION

BACKGROUND

The present invention relates to vital product data, and more specifically, this invention relates to vital product data synchronization across field replaceable unit boundaries in a storage system.

Data redundancy is a characteristic of a storage system which is created when portions of data are held in separate places. Preferably, the portions of data are stored in independent and isolated locations such that failure of a component within the storage system does not result in loss of each copy of the portions of data. Data redundancy is typically performed for backup and recovery purposes. Data redundancy often works to safeguard data and promote data consistency. Multiple sets of the same portions of data may be leveraged for backup purposes, disaster recovery, and quality checks. In the event of a data breach, having the same portions of data stored in several places may be critical to ensure continuity of operations and/or damage mitigation. Data redundancy is a condition which may be leveraged to improve the speed of updates and/or data access.

Data consistency is a condition of the data which ensures that the data is accurate and consistent over the life cycle of the data. Data consistency, and similarly data integrity, is important in the design, implementation, and usage of any system which stores, processes, or retrieves data.

SUMMARY

A method for data synchronization, according to one embodiment, includes identifying a replaced component amongst a plurality of components in a storage system, establishing a quorum amongst the plurality of components in the storage system, and updating vital product data stored on the replaced component based at least in part on the quorum established amongst the plurality of components in the storage system.

A computer program product for data synchronization, according to another embodiment, includes one or more computer readable storage media and program instructions collectively stored on the one or more computer readable storage media. The program instructions include program instructions to perform the foregoing method.

A system, according to another embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 5 is an exemplary detailed flow of the decision tree between four actors in a storage system, in accordance with one embodiment of the present invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for vital product data synchronization across field replaceable unit boundaries in a storage system.

In one general embodiment, a method for data synchronization, includes identifying a replaced component amongst a plurality of components in a storage system, establishing a quorum amongst the plurality of components in the storage system, and updating vital product data stored on the replaced component based at least in part on the quorum established amongst the plurality of components in the storage system.

In another general embodiment, a computer program product for data synchronization includes one or more computer readable storage media and program instructions collectively stored on the one or more computer readable storage media. The program instructions include program instructions to perform the foregoing method.

In another general embodiment, a system includes a processor and logic integrated with the processor, executable by the processor, or integrated with and executable by the processor. The logic is configured to perform the foregoing method.

Figure 1:
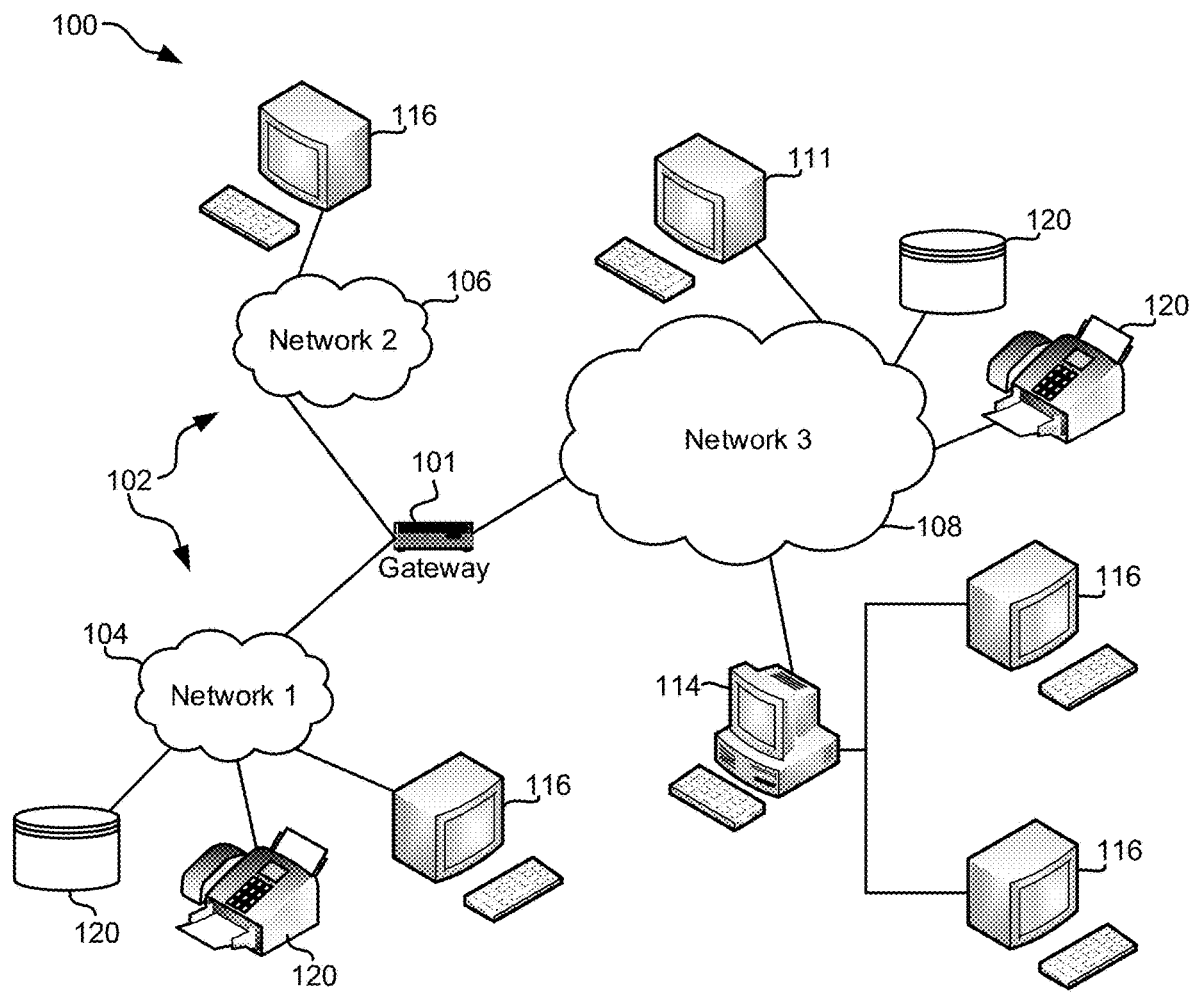
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM—based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
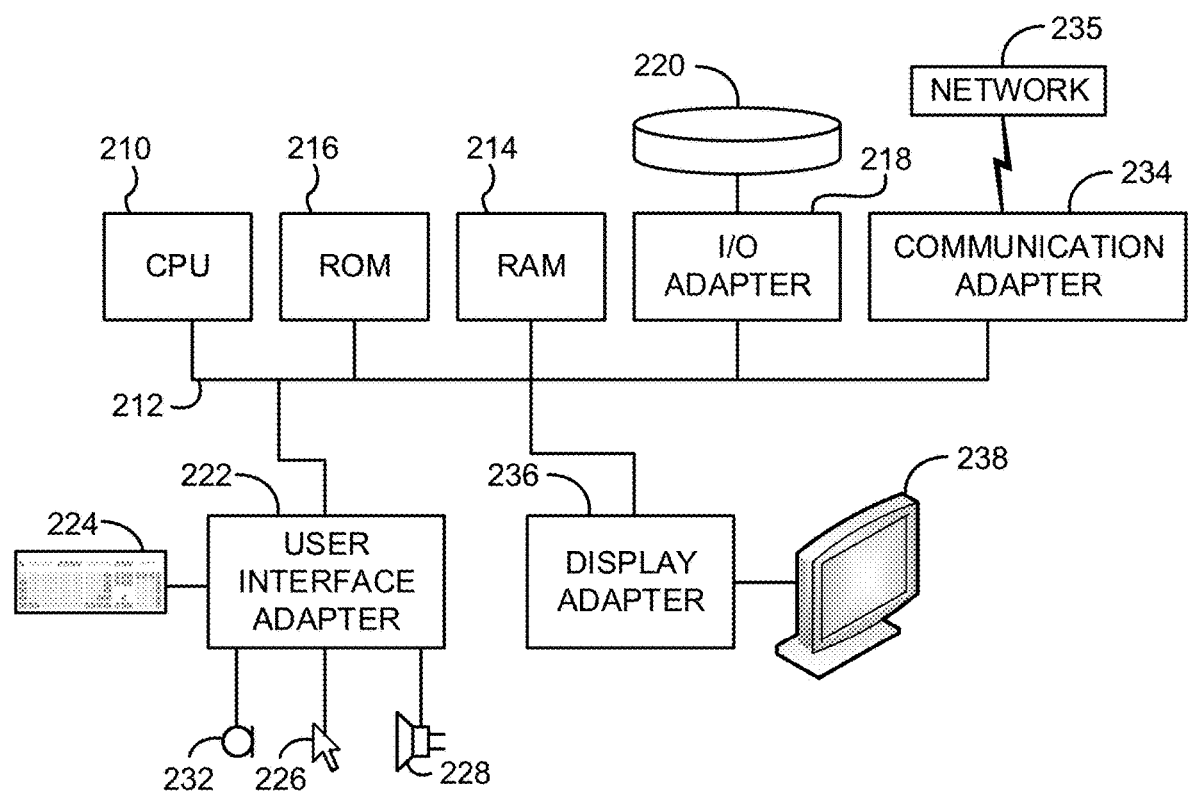
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
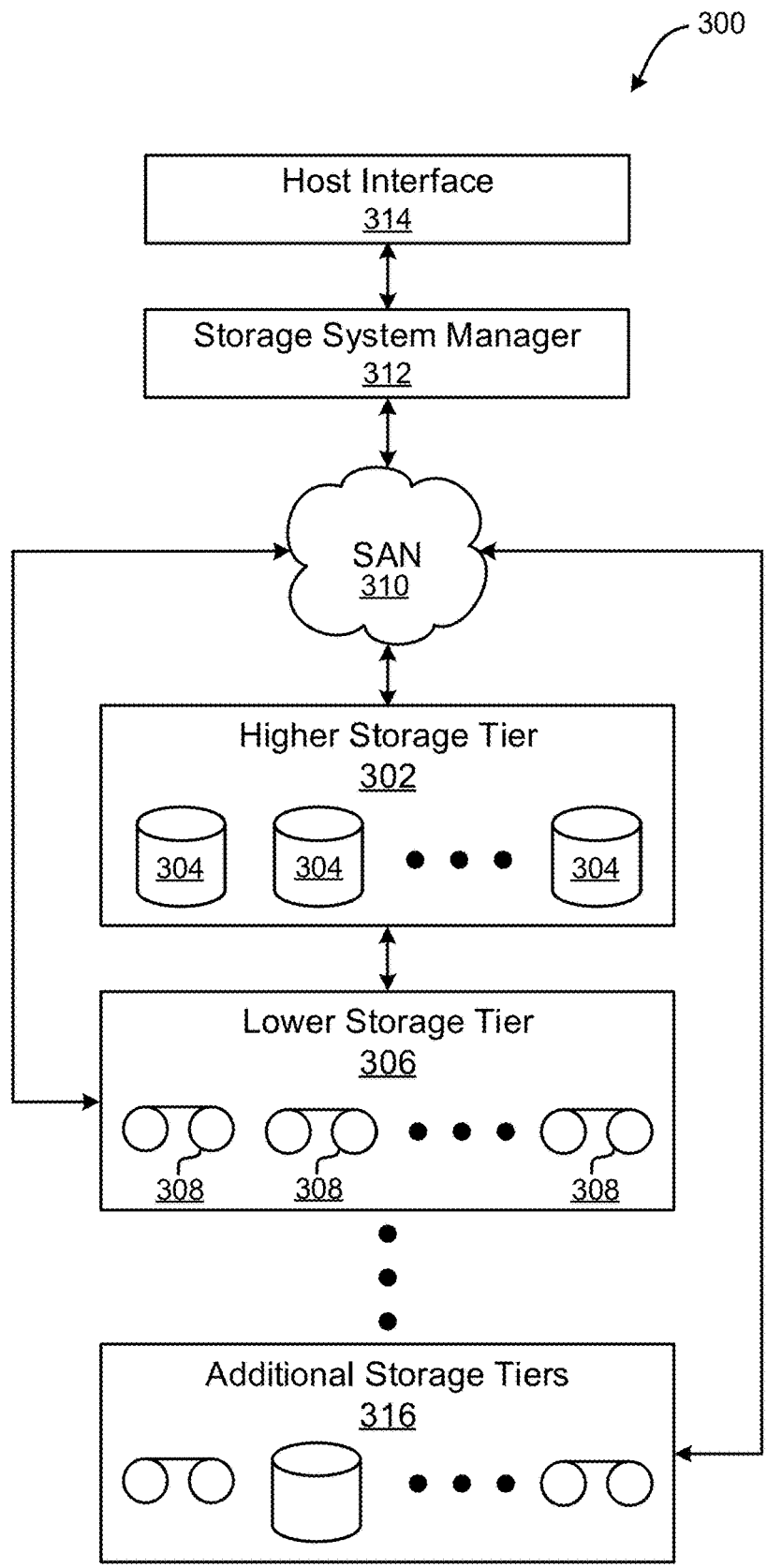
FIG. 3 is a diagram of a tiered data storage system, in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Data redundancy is a condition where at least one copy of data exists in a storage system which is additional to the actual data stored in the storage system. The additional data may be a complete copy of the actual data or portions of the actual data. Data redundancy is conventionally used for detecting errors and reconstruction of lost or damaged data. Data validation is important for maintaining data consistency, and, similarly, data integrity, within any system which stores, processes, or retrieves data.

In conventional systems which require redundant copies of vital product data (VPD), synchronizing data sets includes either copying data manually, or adding additional features to the system software to enable copying of a data set from a known "good" copy to another copy. This becomes increasingly complex when there are a plurality of copies of the data and these copies are stored on multiple units (e.g., which are integrated into a single device) to provide redundancy if any of the units and/or the system fails. When one of the foregoing units is replaced, the state of the art lacks an efficient method for establishing which of the plurality of copies of the data is correct and using that copy to establish a consistent data set across all other copies without manual intervention or without prior establishment of complex software copying features. The state of the art also lacks an automatic and/or autonomous method (e.g., via hardware and/or firmware versus software functionality) for establishing which of the plurality of copies of the data is correct and establishing a consistent data set.

A challenge in conventional storage systems includes synchronizing vital product data and/or data generally between components which are not concurrently maintainable and/or not concurrently replaceable. One solution includes maintaining at least two copies such that, if one copy of the vital product data is compromised, reference to the other copy may be made via manual intervention by a user or service person (e.g., who must manually enter the correct form). In conventional systems, both of these copies are stored (e.g., located) on the same planar or the same device. If one of the copies fails, the entire device storing the at least two copies may be replaced manually in order to restore the condition of data consistency and data redundancy (e.g., return to a state of having two good copies).

In contrast, various embodiments of the present disclosure establish a correct copy and/or use the correct copy to establish a consistent data set while presenting a consistent interface to software. At least some of the aspects described herein provide a flow of operations to determine which copy of the data is usable to synchronize all other copies of the data. Various aspects may determine if a component has been replaced and establishes a quorum between multiple components as part of the determination of the valid data set. At least some embodiments establish a base set of rules for how to determine a correct copy of the data as well as failure cases when no copy of the data is found to be correct (e.g., when the system may fail deterministically).

Vital product data (e.g., vital product information) may include any information which uniquely identifies a product, component, unit, etc. Vital product data may include a serial number, a product description, configuration settings which are persisted, any other configuration settings, etc., or any combination thereof, in various approaches. Vital product data may be compromised if the device having the vital product data stored thereon fails, the vital product data cannot be read and/or written to, the vital product data is overwritten erroneously, etc., as would be understood by one having ordinary skill in the art in view of the present disclosure. A unit having compromised vital product data may be replaced with another component.

An advantage of various procedures described herein is that the copies of the data set (e.g., in the exemplary case, the vital product data) are managed in hardware components and/or embedded firmware without software interaction to manage the consistency of the data. Further, the design of at least some of the embodiments described herein provide a single interface for software to interact with the model (e.g., four copies of the data set on four independent devices may be managed via a single interface). The interface to the software is a unified interface. Various aspects of the methodology described herein do not require manual copying of data or manual intervention by a user. In some approaches, manual intervention may be postponed unless the data consistency fails deterministically through one of the defined failure modes.

Figure 4:
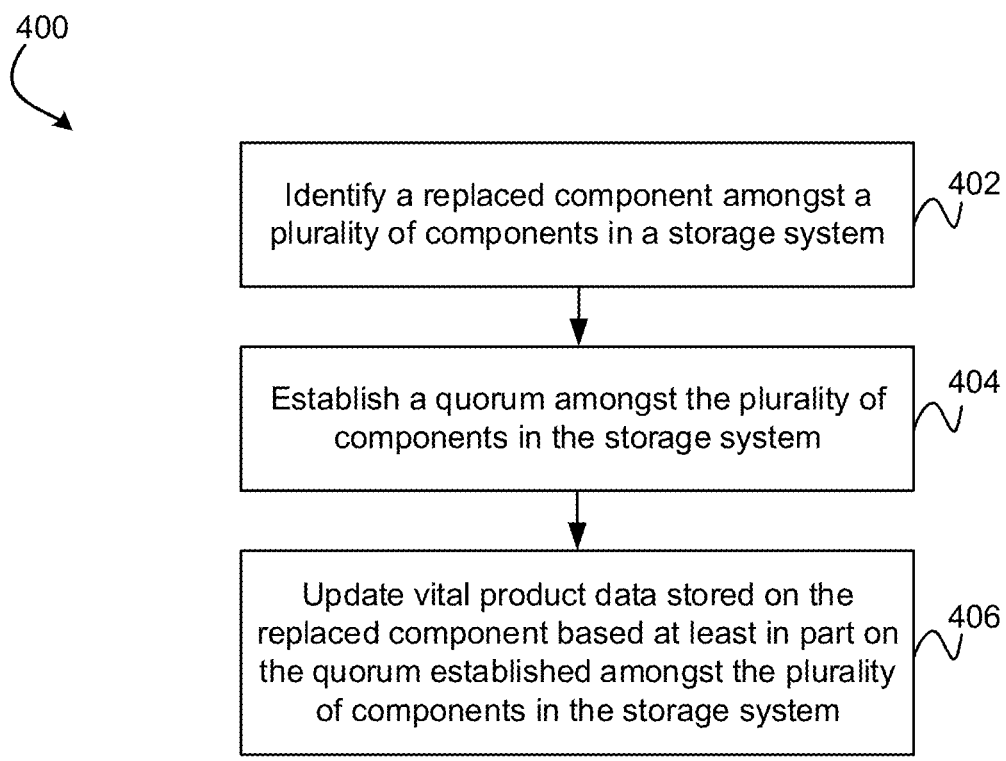
FIG. 4 is a flowchart of a method, in accordance with one embodiment of the present invention.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more, or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by computers, hardware components, embedded firmware level components, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 includes operation 402. Operation 402 includes identifying a replaced component amongst a plurality of components in a storage system. In one approach, identifying the replaced component includes determining whether the state fields of the component have some predefined value(s), e.g., are zero or equivalently, any other value. In the present example, if the state fields are zero, the component is determined not to be configured (e.g., the component is new) and qualifies as a replaced component.

If the state fields are zero, (or are not the predefined value(s) noted above), the component is considered to not be configured. If all state fields are considered to be in a non-configured state, all components and an enclosure comprising the components are in a genesis state as would be understood by one having ordinary skill in the art in view of the present disclosure. Non-zero state fields indicate that the component has not been replaced. In other words, if the state fields are configured, the component has not been replaced (e.g., the component is not new).

In response to determining that the state fields are non-zero, the component may be a component which is configured and includes an already existing data set and/or vital product data. For example, in various approaches, data is written to the vital product data to set the state fields of any component to a known configuration, such that, in response to removing, reinstalling, etc., any of the plurality of components in the system, each of the plurality of components appear to be configured (e.g., not new). In this case, the replaced component may be identified as having a different configuration setting (e.g., state fields) compared to the other components in the plurality of components. For example, a component which is replaced may be a new component (e.g., no state fields are set (the state fields are zero or are the predefined value(s))). In another example, a component which is replaced may be an old component (e.g., having state fields which do not match state fields of the other components in the plurality of components). The component's data set may be used in establishing a quorum in operation 404, to be described in detail below, in some approaches.

In another approach, identifying the replaced component may include identifying a set of data which is written when the component was manufactured, thereby indicating that the component has not been in any previous system, as would become understood by one having ordinary skill in the art upon reading the present disclosure.

In various approaches, the components in the storage system (e.g., including the replaced component) may be replaceable components which can be relatively quickly removed from the storage system without removing an entire product which contains all copies of the vital product data. A replaceable component may be a canister, a customer replaceable unit (CRU), a field replaceable unit (FRU), etc., or any combination thereof. Each component preferably includes a copy of vital product data stored thereon. In various approaches, the storage system and/or at least some components within the storage system include a processor, a VPD processor, a data processor, etc. In at least some approaches, the storage system may include a canister having a programmable system on a chip (PSoC) for implementing various of the aspects described in method 400. Various ones of the components may be local or remote components to the storage system with an interconnect that would provide accessibility between components, as would become apparent to one having ordinary skill in the art in view of the present disclosure.

Operation 404 includes establishing a quorum amongst the plurality of components in the storage system. Establishing a quorum preferably includes determining which component(s) comprise the "correct" version of the vital product data stored thereon (e.g., data validation). Valid vital product data, and/or data generally, may be validated using an established quorum (as described herein) and/or signature information identifying the data. Signature information may include a cyclic redundancy check (CRC), a check sum, SHA-256 hash functions, SHA-512 hash functions, etc., or any combination thereof.

In one approach, establishing a quorum amongst the plurality of components in the storage system includes comparing signature information of the data stored on each of the plurality of components to each of the other signature information of the data stored on the other components. In an exemplary approach, the signature information includes a check sum. In various aspects, a quorum is established in response to determining that at least a simple majority of the components include an identical check sum. For example, in a system comprising 4 components, a simple majority may establish a quorum if 3 of the 4 components include an identical check sum of the data stored thereon.

In other approaches, establishing the quorum amongst the plurality of components in the storage system may include comparing the data itself (e.g., the vital product data) which is stored on each of the plurality of components to data stored on each of the other components.

In approaches where the state fields of the replaced component are non-zero, the data set stored on the replaced component may be considered to establish a quorum amongst the plurality of components in the storage system. For example, the check sum of the data set may be compared to the check sums of the other data sets stored on each of the other components in the plurality of components. A component having state fields as zero may not include a data set (e.g., a check sum may be zero) but may be considered in establishing the quorum in that the check sum of a non-existing data set will not match the check sum of any other component's data set (e.g., for a genesis case of the component, the component is considered replaced).

In some approaches, a quorum may be established based at least in part on the authoritative nature of at least one of the plurality of components. For example, a component may be considered to be "authoritative" based at least in part on the type of component. In some aspects, a component may be established and/or designated as authoritative or non-authoritative at the time of design creation. An authoritative component may be predetermined by a user, a service provider, a manufacturer, etc., in any manner known in the art. An authoritative component may be any sub-system component which is established as authoritative at the time of the design of the system. An authoritative component may be configured to have additional rights for establishing quorum. In various exemplary designs, an authoritative component may be a power interposer module (PIM). In contrast, a canister, a midplane, a power supply, a non-authoritative PIM, or any other computing component, etc., may be considered (and/or designated as) a non-authoritative component. In some approaches, each canister comprises a PSoC for implementing at least some of the operations described herein. Within the plurality of components in the storage system, there may be any combination of authoritative and non-authoritative components.

In one example, in a storage system comprising 4 components, if 2 of the components have identical check sums and the other 2 components have different check sums (e.g., which may be the same or different from one another), the 2 components having identical check sums may establish a quorum without having a traditional, simple majority if the 2 components are authoritative components.

Operation 406 includes updating the vital product data stored on the replaced component based at least in part on the quorum established amongst the plurality of components in the storage system. In one approach, updating the vital product data on the replaced component includes updating the vital product data on the replaced component to match the vital product data associated with components which established the quorum. Updating the vital product data may include writing the vital product data from the components establishing the quorum to the replaced component, overwriting a data set stored on the replaced component with the vital product data from the components establishing the quorum and/or copying the vital product data from the components establishing the quorum.

In one exemplary design, a storage system includes four copies of the data and each copy is stored on an independent, replaceable component. Each copy of the data may be updated to maintain data consistency across the replaceable components. FIG. 5 is an exemplary detailed flow of the decision tree between the four actors in the storage system. FIG. 5 includes an exemplary implementation 500 of at least some aspects of method 400 (described above). In various approaches, the exemplary implementation 500 may be performed by a processor, a VPD processor, a data processor, etc., or any other processing unit for reading data, writing, data, performing calculations on data, etc. The exemplary implementation 500 may be performed by a PSoC I2C via a canister on power up, in at least one approach. The local processor checks the state fields of the components in the storage system (e.g., system hardware configuration fields (SFCG), component state persistent data fields (CMPS), etc.). The exemplary implementation 500 should not be deemed limiting in any way and the various aspects of the present disclosure may be implemented as determinable by one having ordinary skill in the art upon reading the present disclosure.

In this exemplary design, a storage system includes at least 4 components. Each component includes a maintained copy of the vital product data. Each copy of the data is preferably stored in unique locations where each location is independent of the others. In one approach, the system includes 2 non-authoritative replaceable components (e.g., FRUs, non-authoritative FRUs, CRUs), each with their own copy of vital product data, and 2 authoritative replaceable components (e.g., FRUs, authoritative FRUs, CRUs, etc.), each with their own copy of vital product data. A processor (e.g., a VPD processor, a data processor, etc.) may be contained on any replaceable component for implementing at least some of the aspects described herein as would become apparent to one having ordinary skill in the art upon reading the present disclosure.

As described in the exemplary implementation, in one example, if any one of the components fails and/or is replaced, the remaining 3 components may be used to establish a quorum, as described in detail throughout the present disclosure. In general, the four components may include component A1, component A2, component A3, and component A4, where each component denoted by the same letter "A" has the same copy of vital product data stored thereon. In one example, when a component fails, the component is replaced by component B1.

For example, in a scenario having components A1, A2, A3, and B1, components denoted by "A" represent components having the same copy of the vital product data and the component denoted by "B" represents the replaced component having a different copy of the vital product data. If the remaining 3 components include identical copies of the vital product data, the 3 components establish a simple majority of the components resulting in a quorum. The component having a different copy of the vital product data is considered to be wrong (e.g., component B1) and the different copy of the vital product data is overwritten with the vital product data which is considered to be correct (e.g., and may be renamed A4), as established by the quorum of the other 3 components.

Following on the above example, if 2 of the components include identical copies of the vital product data, components A1 and A2, one of the components includes a different copy of the vital product data, component B1, and the last of the components has yet another different copy of the vital product data, component C1, (e.g., 3 different versions of the vital product data), it may be determined that the "A" copy of the vital product data is authoritative to overwrite component B1 and component C1, based at least in part on the type of components of component A1 and component A2. In this case, the two "A" components establish a quorum without a majority because the "A" components are determined to be authoritative in nature.

In another scenario involving the components of the above example, if the storage system comprises components A1, B1, C1, and D1 (e.g., 4 different versions of the vital product data), it may be determined that the "A" copy is authoritative to overwrite component B1, component C1, and component D1, based at least in part on the type of component of component A1. In this case, the "A" component establishes a quorum without a majority because the "A" component is determined to be authoritative in nature.

In yet another scenario involving the components of the above example, if 2 of the components include identical copies of the vital product data (e.g., A1 and A2) and the other 2 of the components include identical copies of the vital product data but the sets of vital product data copies are not identical (e.g., B1 and B2), it may be determined that the "A" copy is authoritative to overwrite component B1 and component B2, based at least in part on the type of components of component A1 and component A2. In this case, the two "A" components establish a quorum without a majority because the "A" components are determined to be authoritative in nature.

In another example, a Read Only Memory may be built into a system such that there are three copies of the vital product data. In one exemplary design of the system, two copies of the vital product data are changeable over time and one copy of the vital product data is not changeable over time. In this exemplary design, the copy that cannot change may be considered authoritative and the other two copies may be considered to be non-authoritative (e.g., as designated by a designer of the system, in at least one approach). During normal operation, as long as the two non-authoritative components are useable, the authoritative components is not used. However, if there is a failure in one of the two non-authoritative copies, the authoritative copy (or parts thereof) may be used to establish a correct data set for each of the non-authoritative copies.

In at least some approaches, the storage system may deterministically fail according to some scenarios. One deterministic failure scenario includes where a quorum cannot be established (e.g., there is no simple majority) and there are no established authoritative components. Exemplary deterministic failure scenarios are bolded in the implementation 500 of FIG. 5.

A benefit of at least some of the aspects described herein includes improving upon conventional designs which store multiple copies of the vital product data on a single device, as described above. In contrast, according to various aspects of the present disclosure, the vital product data may be located on the easily replicable, concurrently replaceable components described herein. This previously-used type of redundancy involves multiple copies of data on a singular plane or singular board which is relatively difficult and/or time-consuming to remove and replace. Other previously-used redundancy designs do not include concurrently replaceable components and require the system to be powered down, thereby temporarily removing access to the system while the repair is being performed. Additional components are included on the device for each component on the single device storing a copy of the vital product data. These additional components may include voltage regulators, independent circuits, etc. These additional components may be an additional cost in maintaining and managing the system. The independent, easily replicable, concurrently replaceable components described herein allow for the concurrent maintenance of the system. The various aspects of the method described herein provide systematic validation and synchronization of the vital product data contained on the independent modules. The benefit of the design disclosed herein having multiple distributed copies of vital product data, wherein a copy is stored on each of plurality of replaceable components and updated according to an established quorum without manual intervention, is the freedom of the midplane component where any of the replaceable components may be replaced completely independently of the system, thereby eliminating the cost and time requirements associated with the prior solution.

Specifically, at least some aspects of this disclosure reduce and/or eliminate components from the midplane of an enclosure. For example, since the data that is stored on electrically erasable programmable read-only memory (EEPROM) is moved to replaceable components, this frees up the components which are conventionally used on the midplane to handle redundant vital product data. This raises the mean time between failures (MTBF) of the midplane and lowers the component cost of the midplane, which, in most conventional systems, is not concurrently replaceable, as described above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data synchronization, comprising:
   identifying a replaced component amongst a plurality of components in a storage system wherein the plurality of components comprises at least one authoritative component;
   establishing a quorum amongst the plurality of components in the storage system, and in response to determining a quorum amongst the plurality of components cannot be established, establishing the quorum based on the at least one authoritative component; and
   updating vital product data stored on the replaced component based at least in part on the quorum established amongst the plurality of components in the storage system.

2. The method of claim 1, wherein the method is implemented at a hardware and/or embedded firmware level.

3. The method of claim 1, wherein the data synchronization does not require software interaction.

4. The method of claim 1, wherein each of the plurality of components in the storage system is a replaceable component.

5. The method of claim 1, wherein each of the plurality of components in the storage system has a copy of the vital product data stored thereon.

6. The method of claim 1, wherein identifying the replaced component includes determining that state fields of the replaced component are set to zero.

7. A computer program product for data synchronization, the computer program product comprising:
   one or more computer readable storage media, and program instructions collectively stored on the one or more computer readable storage media, the program instructions comprising:
   program instructions to identify a first replaced component amongst a plurality of components in a storage system, wherein the plurality of components comprises at least one authoritative component;
   program instructions to, in response to identifying the first replaced component, establish a first quorum amongst the plurality of components in the storage system based at least in part on an authoritative nature of at least one of the plurality of components;
   program instructions to update vital product data stored on the first replaced component based at least in part on the first quorum established amongst the plurality of components in the storage system;
   program instructions to identify a second replaced component amongst the plurality of components in the storage system; and
   program instructions to, in response to identifying the second replaced component and not being able to establish a second quorum amongst the plurality of components in the storage system based at least in part on comparing signature information stored on each of the plurality of components to signature information stored on the each of other of the plurality of components, establish the second quorum based on the at least one authoritative component and update vital product data stored on the second replaced component.

8. The computer program product of claim 7, wherein the data synchronization does not require software interaction.

9. The computer program product of claim 7, wherein each of the plurality of components in the storage system is a replaceable component, wherein the authoritative component is a power interposer module (PIM).

10. The computer program product of claim 7, wherein each of the plurality of components in the storage system has a copy of the vital product data stored thereon.

11. The computer program product of claim 7, wherein identifying the replaced component includes determining that state fields of the replaced component are set to zero.

12. The computer program product of claim 7, wherein the authoritative component is configured to have additional rights for establishing the second quorum.

13. A system, comprising:
a processor; and
logic integrated with the processor, executable by the processor, or integrated with and executable by the processor, the logic being configured to:
identify a replaced component amongst a plurality of components in a storage system wherein the plurality of components comprises at least one authoritative component;
establish a quorum amongst the plurality of components in the storage system, and in response to determining a quorum amongst the plurality of components cannot be established, establishing the quorum based on the at least one authoritative component; and
update vital product data stored on the replaced component based at least in part on the established quorum in the storage system.

14. The system of claim 13, wherein data synchronization does not require software interaction.

15. The system of claim 13, wherein each of the plurality of components in the storage system is a replaceable component.

16. The system of claim 13, wherein each of the plurality of components in the storage system has a copy of the vital product data stored thereon.

17. The system of claim 13, wherein identifying the replaced component includes determining that state fields of the replaced component are set to zero.

18. The system of claim 13, wherein the quorum established amongst the plurality of components in the storage system is based at least in part on comparing signature information stored on each of the plurality of components to signature information stored on the each of other of the plurality of components, wherein the signature information includes information selected from the group consisting of: a cyclic redundancy check (CRC), a check sum, a SHA-256 hash function, and a SHA-512 hash function.

* * * * *